(12) United States Patent
Chen et al.

(10) Patent No.: US 10,834,895 B2
(45) Date of Patent: Nov. 17, 2020

(54) AUTOMATICALLY DRINKING DEVICE FOR PETS

(71) Applicant: Dogness Group LLC, Plano, TX (US)

(72) Inventors: Silong Chen, Dongguan (CN); Yunhao Chen, Plano, TX (US)

( * ) Notice: Subject to any disclaimer, the term of this patent is extended or adjusted under 35 U.S.C. 154(b) by 237 days.

(21) Appl. No.: 16/147,595

(22) Filed: Sep. 29, 2018

(65) Prior Publication Data

US 2020/0100462 A1 Apr. 2, 2020

(51) Int. Cl.
*A01K 7/02* (2006.01)
*A01K 7/06* (2006.01)

(52) U.S. Cl.
CPC ............... *A01K 7/06* (2013.01); *A01K 7/025* (2013.01)

(58) Field of Classification Search
CPC . A01K 7/00; A01K 7/02; A01K 7/022; A01K 7/06; A01K 7/025
USPC ...................................................... 239/29.3
See application file for complete search history.

(56) References Cited

U.S. PATENT DOCUMENTS

| | | | |
|---|---|---|---|
| 8,104,431 B2 * | 1/2012 | Klenotiz | A01K 7/06 119/72 |
| 2010/0175625 A1 * | 7/2010 | Klenotiz | A01K 7/06 119/75 |
| 2019/0075755 A1 * | 3/2019 | Imaizumi | A01K 7/025 |

FOREIGN PATENT DOCUMENTS

| | | | | |
|---|---|---|---|---|
| DE | 202019101589 U1 | * | 4/2019 | ............. A01K 7/02 |
| GB | 2572028 | * | 9/2018 | ............. A01K 39/02 |
| WO | WO-2019228111 A1 | * | 12/2019 | ............. F16K 5/00 |

* cited by examiner

*Primary Examiner* — Kristen C Hayes
(74) *Attorney, Agent, or Firm* — ZANIP

(57) ABSTRACT

The present invention provides an automatically drinking device for pets, which includes a water storage tank with an opening, a drinking water tray arranged on the opening of the water storage tank, and a pump with lamp fixed in the water storage tank; the top face of the drinking water tray is depressed down to form a sink, the sink is provided with a spray jet which is connected with the outlet of the pump with lamp through a water pipe; the lower end of the drinking water tray is provided with a water filtering structure in the water storage tank; the water filtering structure comprises a filtering plate, a filtering box contained in the filtering plate and a nylon net arranged between the filtering plate and the filtering box, which has the advantages of simple structure, diverse functions and low processing cost.

11 Claims, 4 Drawing Sheets

AUTOMATICALLY DRINKING DEVICE FOR PETS

FIELD OF THE INVENTION

The present invention relates to drinking device for pets technical fields, more specifically relates to an automatically drinking device for pets.

BACKGROUND OF THE INVENTION

With the gradual improvement of people's living standard, more and more pets are being kept. Solving the problem of drinking water is one of the key problems in pet keeping. At present, due to the limitation of imperfect design and other factors such as product structure and function, the existing drinking devices for pets have the following problems in the practical application process: 1. backwater filtration effect and drainage performance are poor. Pet hair, debris and so on can easily clog the water outlet of the drinking device, which makes the drinking water accumulate or overflow in the drinking water plate because it can not be refluxed and filtered in time, which leads to the deterioration of the drinking water because of the pollution. 2. the drinking devices have no filtering function or poor filtering function for pet hair loss, which can not guarantee the water quality and will also make the water pump often clogged by. It increases the workload of the breeders. 3. The structure of the drinking device requires the breeder to open the lid of it to see the internal water quantity, which is not convenient for the breeder to understand the water quantity it directly increase the workload of the breeder. 4. The function of the drinking device is relatively single, the structure of the drinking device is relatively complex, and the processing cost of the drinking device is high, which can not meet the actual needs of breeder and also reduce the effect of attracting the pets to drink water.

BRIEF SUMMARY OF THE INVENTION

In order to overcome the shortcomings of the prior art, the present invention provides an automatically drinking device for pets, which has the advantages of simple structure, diverse functions and low processing cost. The automatically drinking device for pets can be seen intuitively the water quantity by a transparent strip piece, and the automatically drinking device has provided a water quality filtration structure with the nylon net, which ensures the water quality, improves the cleaning cycle of the pump due to the clogging of the hairs and extends the service life.

The technical proposals of the present invention are as follows: an automatically drinking device for pets includes a water storage tank with an opening, a drinking water tray arranged on the opening of the water storage tank, and a pump with lamp fixed in the water storage tank; the top face of the drinking water tray is depressed down to form a sink. The sink is provided with a spray jet which is connected with the outlet of the pump with lamp through a water pipe; the lower end of the drinking water tray is provided with a water filtering structure in the water storage tank; the water filtering structure comprises a filtering plate, a filtering box contained in the filtering plate, and a nylon net arranged between the filtering plate and the filtering box; the drinking water tray is provided with a few nozzle; the housing of the water storage tank is provided with a strip transparent piece perpendicular to the horizontal plane, and the water level in the water storage tank can be seen through the strip transparent part.

Preferably, the edge of the drinking water tray extends backwards to form an arc convex part.

Preferred, the lower end of the drinking water tray is provided with a fixed seat for fixing the water quality filtering structure; the lower end of the fixed seat is provided with a plurality of L-shaped buckles; the upper side wall of the filtering plate is provided with a plurality of projections connected with the L-shaped buckles.

Preferred, the pump with lamp is arranged on the inner cavity of the water storage tank or on the housing thereof.

Preferred, the bottom surface of the water storage tank is provided with a convex seat clamped with the pump with lamp, and the side wall of the water storage tank is provided with a convex strip arranged vertically.

Preferred, the bottom surface of the water storage tank is evenly provided with at least four anti-skid foot bases, an EVC anti-skid foot pad is accommodated in each of the anti-skid foot bases.

Preferred, the edge of the bottom end of the drinking water tray is provided with a circle protruding end; the inner wall of the water storage tank is uniformly provided with a plurality of reinforcing bars, and the reinforcing bars are arranged at the opening of the water storage tank with a chute; the circle protruding end is inserted into the chute and actively connected with it.

Preferred, an arc groove is arranged on one side of the bottom surface of the water storage tank.

Preferred, the nylon net is 80 meshes.

Compared with the prior art, the advantages of the present present invention are as follows:

1. the automatically drinking device for pets is provided with an strip transparent piece on the housing of the water storage tank, it is convenient for the breeder to see the water level in the water storage tank in the present present invention.

2. the automatically drinking device for pets in the present present invention is provided with the pump with lamp in the water storage tank, the light of the lamp shines into the water and diffuses out through the strip transparent piece to facilitate the pets to drink water at night, and the light presents a hazy feeling and does not dazzle the eyes of the pets.

3. the automatically drinking device for pets in the present present invention is provided with the nylon net in the water filtering structure. The nylon net can filter out the hair that the pet falls off into the water, so that the water is clear and hairless, which ensures the water quality, and improves the cleaning cycle of the pump due to the clogging of the hair and extends the service life.

4. the automatically drinking device for pets in the present present invention has the advantages of simple structure, beautiful appearance and diverse function, it is convenient to produce.

DETAILED DESCRIPTION OF THE INVENTION

In order to make aims of the present invention more clear, the technical scheme and the technical effect are more clear, the present invention is further explained in combination with the specific embodiment. It should be understood that the specific embodiments described herein are used only to explain the present invention and not to define the present invention.

Figure 1:
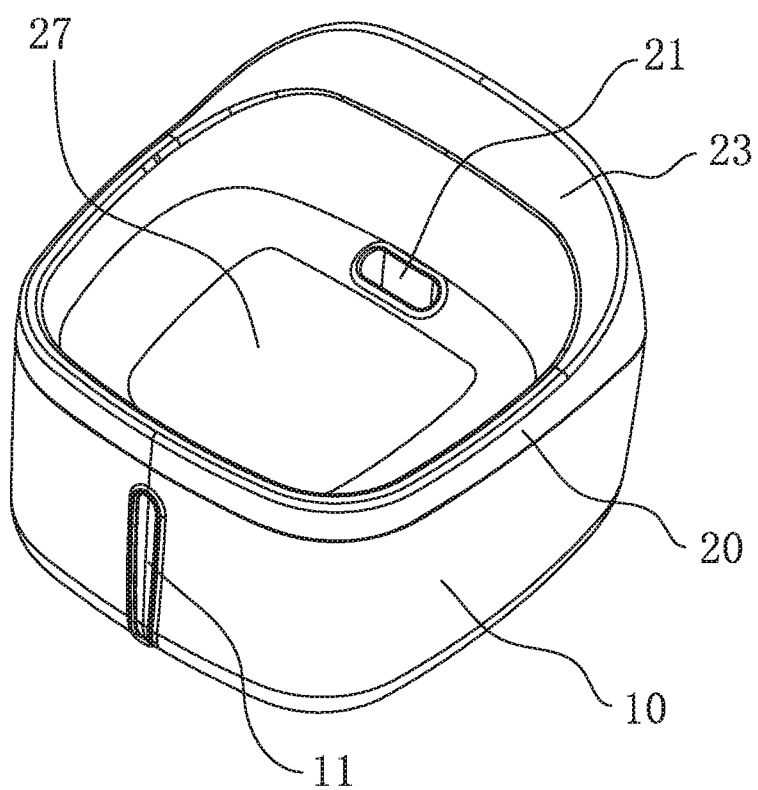
FIG. 1 is a schematic diagram of the automatically drinking water device for pets in the present invention.

Referring to FIG. 1, the automatically drinking water device for pets includes a water storage tank 10 with an opening, a drinking water tray 20 arranged on the opening of the water storage tank 10 and a pump 30 with lamp fixed in the water storage tank 10.

The top face of the drinking water tray 20 is depressed down to form a sink 27. The sink 27 is provided with a spray jet 21 which is connected with the outlet of the pump with lamp 30 through a water pipe 28; the bottom of the sink 27 is provided with a water filtering structure 40 in the water storage tank 10. The water filtering structure 40 comprises a filtering plate 41, a filtering box 42 contained in the filtering plate 41, and a nylon net 43 arranged between the filtering plate 41 and the filtering box 42. The drinking water tray 21 is provided with a few nozzle 22 in the overlay area of the water filtering structure 40. The pump 30 with lamp pumps the water in the water storage tank 10 through the water pipe 28 and sprays it from the spray jet 21 to the sink 27 for the pet to drink. Water in the sink 27 may flow into the water filter device 40 through the nozzles 22. The filtering plate 41 filters the impurities to make the water clear, and then the nylon mesh 43 filters the pet hair. After the two filter processing, the hairless and clear water returned to the water storage tank 10. Thus, the water can be continuously circulated and filtered by the pump with lamp 30 to ensure the quality of water.

Figure 2:
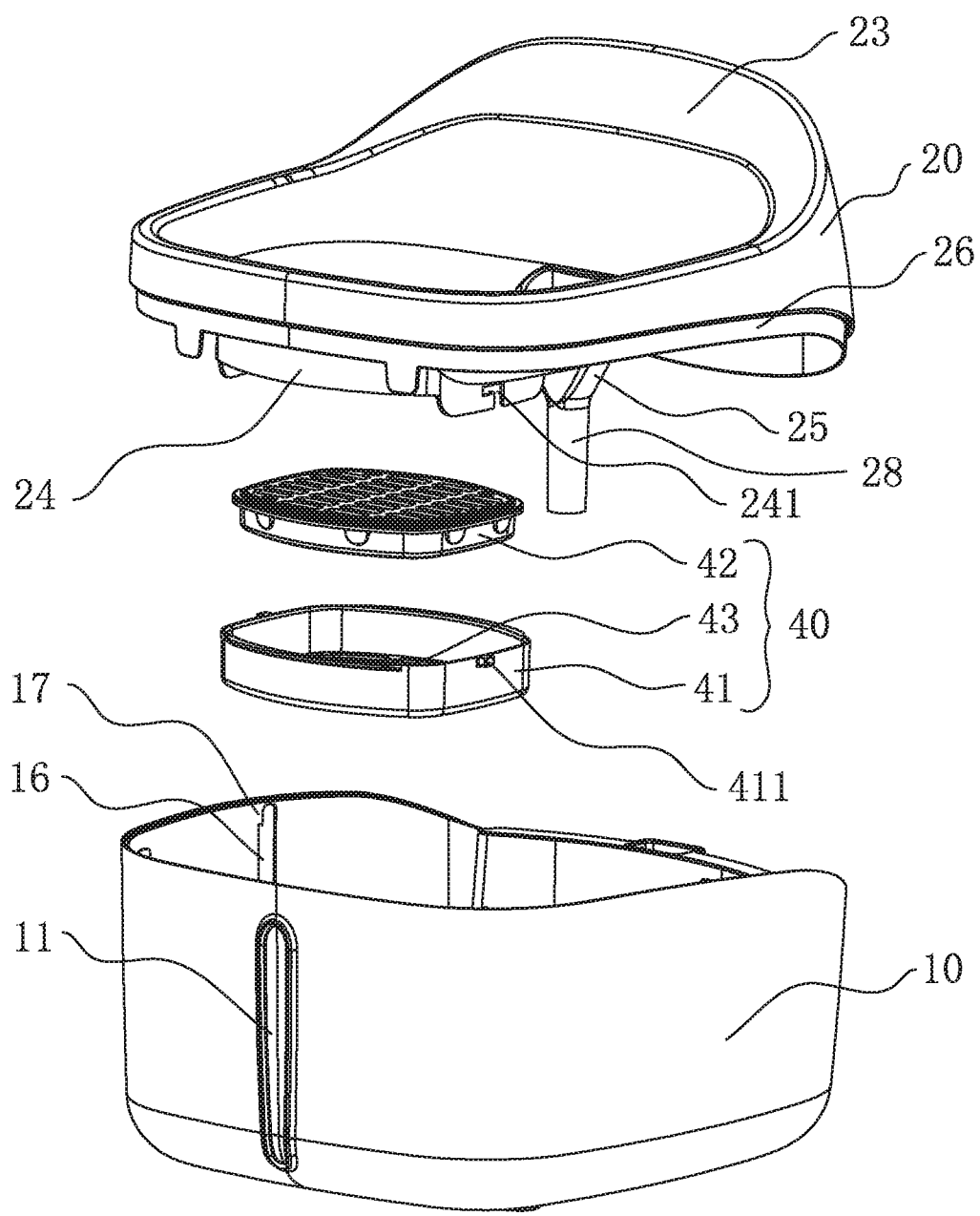
FIG. 2 is an explode schematic diagram of the automatically drinking water device for pets in the present invention.

Further, referring to FIG. 2, the lower end of the drinking water tray 20 is provided with a fixed seat 24 which is used for installing the water filter device 40. The lower end of the fixed seat 24 is provided with a plurality of L-shaped buckles 241; the upper side wall of the filtering plate 41 is provided with a plurality of projections 411 matching the L-shaped buckles. The projection 411 is inserted into the L-shaped buckle 241 so that the water filtering structure 40 is fixed at the lower end of the drinking water tray 20. Accordingly, the projection 411 and the L-shaped buckle 241 may be located at the lower end of the fixed seat 24 or the upper side wall of the filtering plate 41, as long as they are arranged in pairs. The filtering box 42 is provided with active carbon, PP cotton and other substances with filtration function. The filtering impurities make the water active and clear. The nylon net 43 is 80 mesh super fine nylon net used to filter the hair shed by the pet, so that the water is clear without hair, which ensures the water quality, and improves the cleaning cycle of the pump due to the clogging of the hair and extends the service life.

Figure 3:
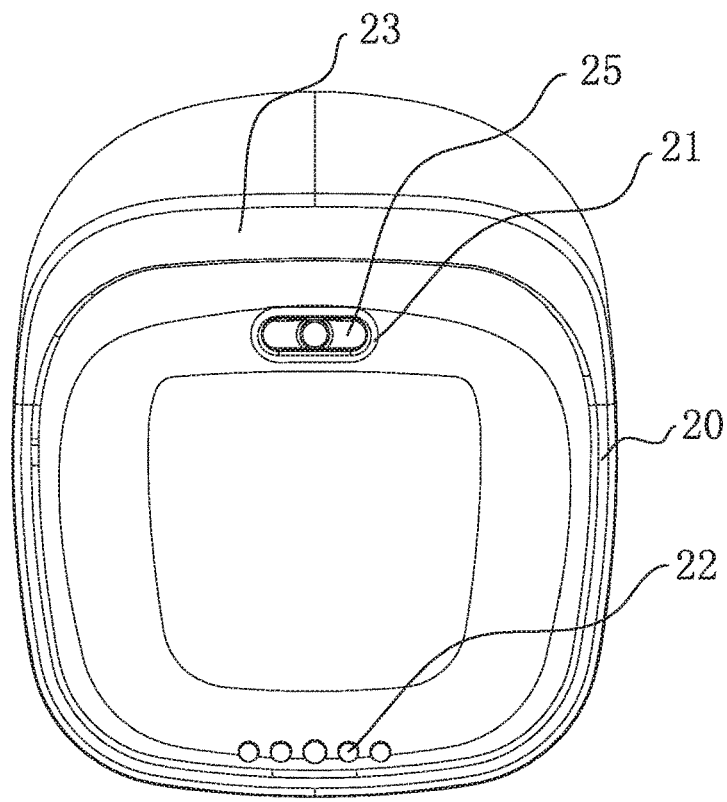
FIG. 3 is a top view of the drinking water tray of the automatically drinking water device for pets in the present invention.
Figure 4:
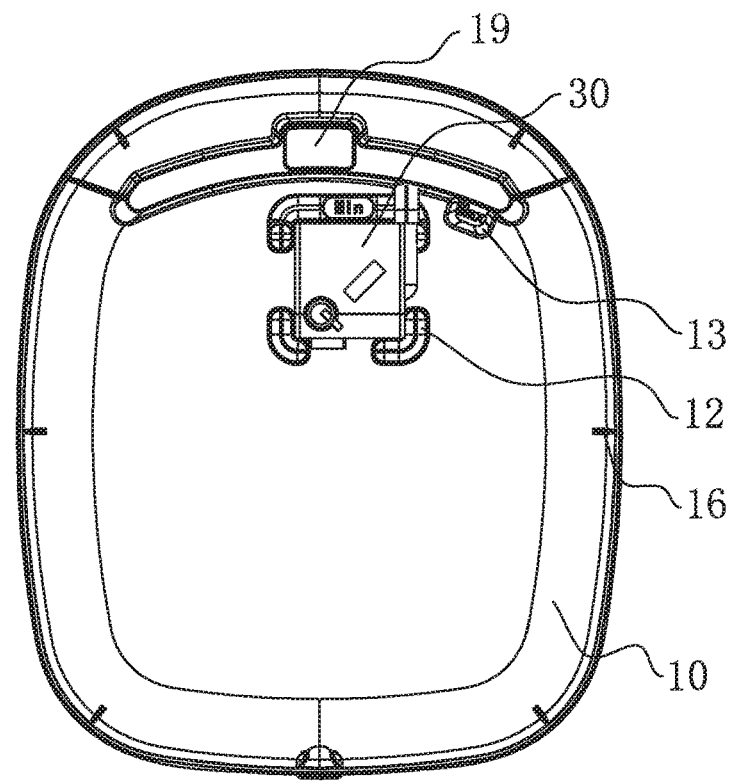
FIG. 4 is a top view of the water storage tank of the automatically drinking water device for pets in the present invention.

Referring to FIG. 2, FIG. 3 and FIG. 4, the nozzle of the spray jet 21 is arranged as an inverted triangle flume 25. The pump with lamp 30 draws water from the water storage tank 10 and ejects from the spray jet 21, by reasonably designing the size and shape of the diffuse flume 25, the height of the water ejection can be controlled so that the water can be sprayed inside the sink 27 without spilling out of the drinking water device. With the design, the state of water ejection has the effect of spring, which can attract pet's interest in drinking water. The edge of the drinking water tray 20 extends backward to form a circular arc convex part 23. The circular arc convex part 23 is convenient for the breeder to grab the drinking water tray 20 by hand and take it out of or into the water storage tank 10; and the spray jet 21 is arranged within the drinking water tray 20 near the circular arc convex part 23, which also can effectively block the water spatter out of the drinking water device. An arc groove 18 is arranged on one side of the bottom surface of the water storage tank 10, and the top end of the arc groove 18 is provided with an opening 19 in the water storage tank 10. The opening 19 facilitates the electrical connection of the pump with lamp 30 to connect to the external power supply. The arc groove 18 facilitates the breeder to reach in and hold the water storage tank 10 and add water to the water storage tank 10.

Referring to FIG. 2, the housing of the water storage tank 10 is provided with a strip transparent piece 11 perpendicular to the horizontal plane. The strip transparent piece 11 enables the breeder to see clearly the water level in the water storage tank 10, which is convenient for the breeder to intuitively understand the amount of water in the water device, and to add appropriate water into it to ensure that there is sufficient water in it. Furthermore, the light of the pump with lamp 30 (which belongs to the prior art, the structure is not described here) is illuminated into the water and diffused through the strip transparent piece 11 to facilitate the pets to drink water at night, and the light presents a hazy feeling and does not dazzle; The light are hazy and unobtrusive.

Referring to FIG. 4, the pump with lamp 30 may be selectively disposed on the water storage tank 10 inner chamber or the housing of water storage tank 10. Preferred, the pump with lamp 30 is arranged in the housing of water storage tank 10, and the switch of the pump with lamp 30 is exposed to the water storage tank 10. Thus, the lamp water pump 30 can be started or closed directly outside the water storage tank 10 for convenient use.

Figure 5:
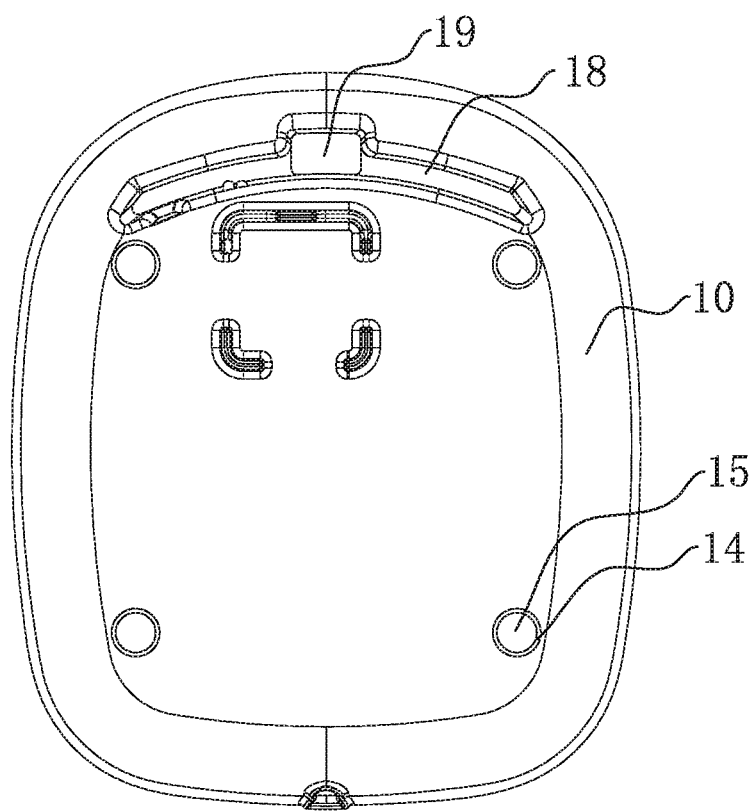
FIG. 5 is the elevation diagram of the water storage tank of the automatically drinking water device for pets in the present invention.

Referring to FIG. 2, FIG. 4 and FIG. 5, the inner bottom surface of the water storage tank 10 is provided with a convex seat 12 which is clamped with the lamp water pump 30, and the inner side wall of the water storage tank 10 is provided with a convex strip 13 arranged vertically. The upper end of the convex seat 12 is provided with the lowest water level word Min, the convex strip 13 upper end is provided with the highest water level word Max. It is convenient for breeders to understand the amount of water added to the water device and ensure that the water device is in an appropriate state of use. The bottom surface of the water storage tank 10 is uniformly provided with at least four anti-skid foot seats 14, and a EVC anti-slip foot pad 15 which is contained in the anti-slip foot seat 14. The EVC anti-slip pad 15 enhances the friction between the water device and the ground, making the water device not easily overturned by the pet. The lower end of the drinking water tray 20 is provided with a circle protruding end 26 along the edge. The inner wall of the water storage tank 10 is uniformly provided with a plurality of reinforcement bars 16, the reinforcement bars 16 is provided with a chute 17 at the opening of the water storage tank 10; the protruding end 26 is inserted into the chute 17 and is connected with the chute 17; The actively connection method enables the drinking water tray 20 to be stably connected to the water storage tank 10. The reinforcing bar 16 can enhance the strength of the water storage tank 10. The water storage tank 10 and the drinking water plate 20 adopt an integrated molding structure (such as through plastic could molding, etc.), which makes the automatically drinking water device of pets in the present invention not only has simple structure, beautiful appearance. It is not only convenience to produce but also effectively reduce processing costs.

The above content is a further detailed explanation of the present invention in combination with the specific optimal implementation mode, and it cannot be assumed that the concrete implementation of the present invention is limited to these instructions only. For the person having ordinary skill in the art, the structure form of the present invention can be flexible and changeable, and a series of products can be derived without departing from the concept of the present invention. A number of simple deductions or replacements shall be deemed to fall within the scope of patent protection determined by the submitted claims.

What is claimed is:

1. An automatically drinking device for pets, where comprising a water storage tank with an opening, a drinking water tray arranged on said opening of said water storage tank, and a pump with lamp fixed in said water storage tank; the top face of said drinking water tray is depressed down to form a sink, said sink is provided with a spray jet which is connected with the outlet of said pump with lamp through a water pipe; the bottom of said drinking water tray is provided with a water filtering structure in said water storage tank; said water filtering structure comprises a filtering plate, a filtering box contained in said filtering plate, and a nylon net arranged between said filtering plate and said filtering box; said drinking water tray is provided with a few nozzles at the overlay area of said water filtering structure; the housing of said water storage tank is provided with a strip transparent piece perpendicular to horizontal plane, and the water level in said water storage tank can be seen through said strip transparent piece.

2. The automatically drinking device for pets according claim 1, wherein the edge of said drinking water tray extends backwards to form an arc convex part.

3. The automatically drinking device for pets according claim 1, wherein the lower end of said drinking water tray is provided with a fixed seat for fixing said water filtering structure; the lower end of said fixed seat is provided with a plurality of L-shaped buckles; the upper side wall of said filtering plate is provided with a plurality of projections matching said L-shaped buckles.

4. The automatically drinking device for pets according claim 2, wherein the lower end of the drinking water tray is provided with a fixed seat for fixing said water filtering structure; the lower end of said fixed seat is provided with a plurality of L-shaped buckles; the upper side wall of said filtering plate is provided with a plurality of projections matching said L-shaped buckles.

5. The automatically drinking device for pets according claim 1, wherein the nozzle of said spray jet is arranged as an inverted triangle flume.

6. The automatically drinking device for pets according claim 1, wherein said pump with lamp is arranged on said inner cavity of said water storage tank or on said housing thereof.

7. The automatically drinking device for pets according claim 5, wherein the bottom surface of said water storage tank is provided with a convex seat clamped with said pump with lamp, and the side wall of said water storage tank is provided with a convex strip arranged vertically.

8. The automatically drinking device for pets according claim 1, wherein the bottom surface of said water storage tank is evenly provided with at least four anti-skid foot bases, an EVC anti-skid foot pad is accommodated in each of said anti-skid foot bases.

9. The automatically drinking device for pets according claim 1, wherein the edge of the bottom end of said drinking water tray is provided with a circle protruding end; the inner wall of said water storage tank is uniformly provided with a plurality of reinforcing bars, and said reinforcing bars are arranged at the opening of said water storage tank with a chute; said circle protruding end is inserted into said chute and actively connected with it.

10. The automatically drinking device for pets according claim 1, wherein an arc grooves arranged on one side of the bottom surface of said water storage tank.

11. The automatically drinking device for pets according claim 1, wherein said nylon net is 80 meshes.

* * * * *